United States Patent [19]

Itamura et al.

[11] 3,919,683

[45] Nov. 11, 1975

[54] ULTRASONIC WAVE TRANSMITTING AND RECEIVING APPARATUS

[75] Inventors: Einoshin Itamura, Tokyo; Kazuhiro Iinuma, Yokohama, both of Japan

[73] Assignee: Tokyo Shibaura Electric Co., Ltd., Kawasaki, Japan

[22] Filed: May 13, 1974

[21] Appl. No.: 469,504

[30] Foreign Application Priority Data

May 21, 1973 Japan ............................... 48-55556

[52] U.S. Cl. .................. 340/1 R; 73/67.85; 73/67.9

[51] Int. Cl.² ............................................ G01S 9/66

[58] Field of Search .................... 340/1 R, 3 R, 5 R; 73/67.85, 67.9

[56] References Cited

UNITED STATES PATENTS

| | | | |
|---|---|---|---|
| 3,090,030 | 5/1963 | Schuck | 340/1 R |
| 3,693,415 | 9/1972 | Whittington | 73/67.85 |

*Primary Examiner*—Richard A. Farley
*Attorney, Agent, or Firm*—Oblon, Fisher, Spivak, McClelland & Maier

[57] ABSTRACT

An ultrasonic wave transmitting and receiving apparatus includes a delay pulse signal generating unit for generating a plurality of delay pulses in response to control signals generated from a control signal generator unit. Every two of said plurality of delay pulses is designed to have the same length of delay time. Drive pulse generating units are provided which are respectively designed to generate drive pulses in delay times respectively corresponding to a delay time in which a delay pulse is supplied, in response to the supply of said respective delay pulses. Said drive pulse generating units are respectively connected to respective electronic switch circuits for performing the switching operation so as to supply said respective drive pulses to prescribed piezoelectric elements in order to cause said elements to generate ultrasonic wave beams to be focussed. Said electronic switch circuits are each constituted by a plurality of switch circuit elements for performing the switching operations in a manner displaced in turn one by one for every prescribed number of elements upon receipt of switch circuit controlling signals. An ultrasonic wave receiving apparatus is provided which is designed to detect ultrasonic wave receiving information signals from reflected ultrasonic wave beams and to correct for combination these information signals through a delay circuit having a prescribed length of delay time.

5 Claims, 14 Drawing Figures

ULTRASONIC WAVE TRANSMITTING AND RECEIVING APPARATUS

This invention relates to an ultrasonic wave transmitting and receiving apparatus, and more particularly to an ultrasonic wave transmitting and receiving apparatus capable of effecting high speed-scanning while ultrasonic wave beams are being electronically focussed.

Ultrasonic wave diagnosis apparatuses designed to perform diagnosis by effecting scanning with ultrasonic wave beams include the one based on the adoption of a sector type electronic scanning system, wherein a plurality of elongate piezoelectric elements are arranged on the same plane; ultrasonic wave transmitting signal generators and ultrasonic wave receiving detectors are respectively connected to said piezoelectric elements; and said piezoelectric elements are driven in a prescribed sequence in a prescribed length of delay time thereby to vary the directional characteristics of the ultrasonic wave beams, thus to carry out sector scanning. In said sector type electronic scanning sytem, the enlargement of a visual field requires narrowing the width of each piezoelectric element; and the attainment of sharper directional characteristics requires increasing the piezoelectric elements in number and further requires the same number of ultrasonic wave transmitting signal generators, ultrasonic wave receiving detectors and electronic circuits associated therewith as that of piezoelectric elements, resultantly to render the circuit construction complicated.

An object of the invention is to provide an ultrasonic wave transmitting and receiving apparatus capable of focussing a plurality of ultrasonic wave beams on an object substance and scanning the object substance by said focussed beams and effecting electric conversion of ultrasonic wave beams reflected from the object substance.

Another object of the invention is to provide an ultrasonic wave transmitting and receiving apparatus capable of attaining high directional characteristics and bearing resolution with a small number of circuit construction elements.

In the ultrasonic wave transmitting and receiving apparatus according to the invention the delay pulse signal generator is designed to generate plural pairs of delay pulse signals, one pair of which have the same length of delay time and a length of delay time different from that of another, in response to control signals generated from the control signal generating unit. Said plurality of delay pulse signals are supplied to the respective drive pulse generating units from which high frequency-drive pulses are respectively generated in a delay time corresponding to that of each delay pulse. A switch circuit is operated which is designed to perform the switching operation so as to supply said drive pulses to respective prescribed electro-acoustic conversion elements for the purpose of generating ultrasonic wave beams being focussed. Said switch circuit is constituted by a plurality of electronic switches switched in turn for every prescribed number of switches in response to switch circuit controlling signals. The respective electro-acoustic conversion elements generate information signals in respective prescribed delay times upon receipt of the reflected ultrasonic wave beams. Said respective information signals are supplied to an ultrasonic wave receiving information signal detector through said switch circuit. Said detector includes an electronic switch circuit designed to supply said respective information signals to a prescribed delay circuit so as to equalize the delay times of the information signals. The information signals equalized in delay time are composed and supplied to an indication apparatus.

This invention can be more fully understood from the following detailed description when taken in conjunction with the accompanying drawings, in which.

Figure 1:
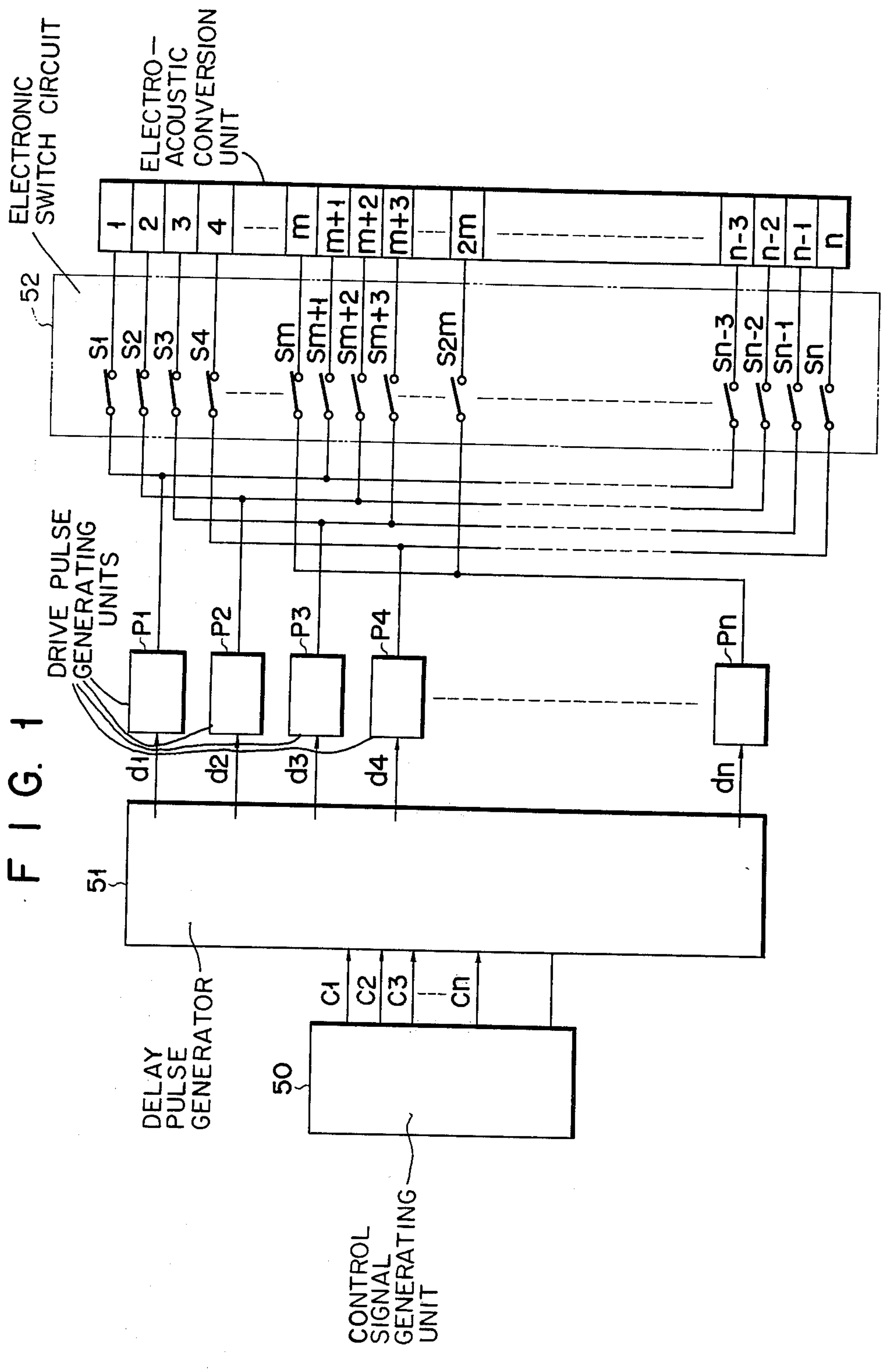
FIG. 1 is a circuit diagram showing the ultrasonic wave transmitting circuit of an ultrasonic wave transmitting and receiving apparatus according to an embodiment of the invention.

Referring to FIG. 1, a control signal generating unit 50 is so constructed as to generate clock pulse signals and control pulse signals C1, C2, C3 . . . C$n$ in turn at prescribed intervals, and a delay pulse generator 51 is designed to generate a plurality of delay pulse signals $d$1, $d$2, $d$3 . . . dn in response to the respective control pulse signals from said control signal generating unit 50. Said delay pulse signals are supplied to respective drive pulse generating units P1, P2, P3 . . . P$n$ which are designed to generate drive pulses in response to the respective delay pulse signals. The output of said drive pulse generating unit P1 is coupled to elements 1, $m$ + 1, . . . of a plurality of electro-acoustic conversion elements, for example, piezoelectric elements, arranged in sequence on the same plane via switches S1, S$m$+1, . . . of a switch circuit 52. The output of the drive pulse generating unit P2 is coupled to elements 2, $m+2$, . . . via switches S2, S$m+2$, . . . Similarly, the drive pulse generating units P3 to P$n$ are connected to the electro-acoustic conversion elements via prescribed switches, respectively.

When, in the above-described cirucit construction, drive pulses are generated in respective prescribed delay times from the drive pulse generating units P1 to P$n$ under the condition in which, for example, an $m$ number of switches S1, S2, . . . S$m$ are closed and the remaining is opened, the electroacoustic conversion elements 1, 2, 3, . . . $m$ are operated to cause ultrasonic wave beams to be focussed on a prescribed point. Next, when the switches S2, S3 . . . S$m+1$ are closed and the remaining switches are all opened and the delay times of delay pulses respectively supplied to the drive pulse generating units P1 to P$n$ are displaced pulse by pulse, the focussing point of ultrasonic wave beams is shifted to a position displaced to an extent of one electro-acoustic conversion element in parallel with the arrangement of the elements. When, as above described, the closed switches of the switch circuit are displaced one by one and simultaneously the delay times of delay pulses are displaced pulse by pulse to energize in turn the electro-acoustic conversion element, the focussing point of ultransonic wave beams is made to scan the object substance in parallel with the arrangement of the elements.

For more detailed explanation of the invention there will now be described by reference to FIGS. 2 and 3 an apparatus wherein the piezoelectric elements are energized in a manner displaced one by one in units of six elements thereby to carry out scanning by focussed ultrasonic wave beams.

Figure 2:
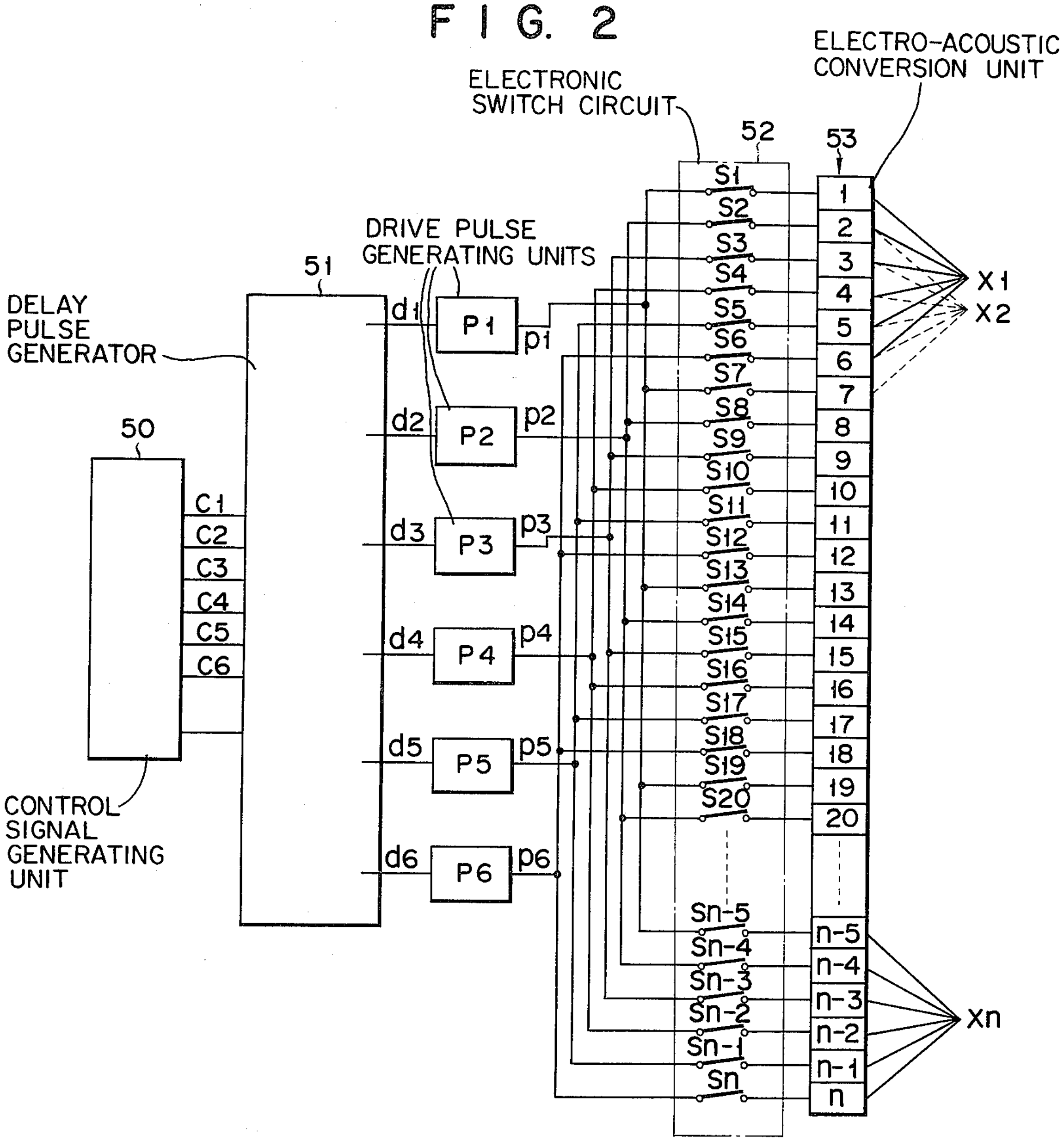
FIG. 2 is a circuit diagram showing the ultrasonic wave transmitting circuit designed to drive piezoelectric elements for every six elements for the purpose of generating ultrasonic wave beams being focussed.
Figure 3:
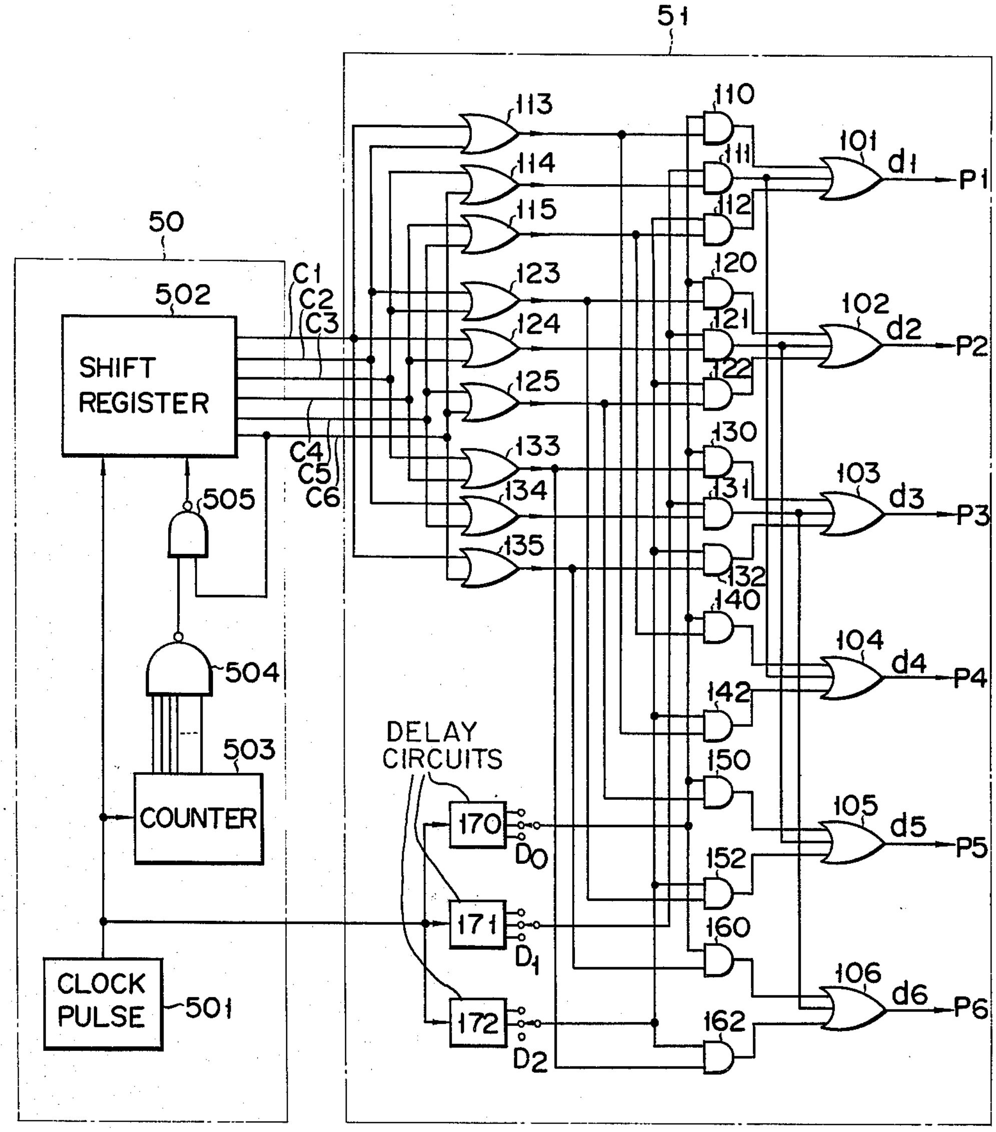
FIG. 3 is a circuit diagram showing the control pulse generating units and the drive pulse generating units shown in FIG. 2.

Referring to FIG. 2, the control pulse generating unit 50, delay pulse generator 51, drive pulse generating units P1 to P6, electronic switch circuit 52 and electro-acoustic conversion unit 53 are connected to each other in the same relationship as shown in FIG. 1. In FIG. 3, the concrete circuit constructions of the control pulse generating unit 50 and delay pulse generator 51 are shown. The control pulse generator unit 50 is so constructed that clock pulse signals from a clock pulse generator 501 are supplied to a shift register 502, counter 503, and delay circuits 170, 171 and 172. The outputs of the counter 503 are supplied to the inputs of a NAND gate 504, the output of which is connected to one input of a NAND gate 505, the output of which is supplied to the shift register 502. The output signals C1 to C6 generated from the register 502 are supplied to the delay pulse generator 51, and the output signal C6 is also supplied to the other input of the NAND gate 505. The delay pulse generator 51 is so constructed that the respective first inputs of OR gates 113, 124 and 135 are connected to the output C1 of the register 502; the second input of the OR gate 113 and the respective first inputs of OR gates 123 and 134 are connected to the output C2; the second input of the OR gate 123 and the respective first inputs of OR gates 114 and 133 are connected to the output C3; the respective second inputs of the OR gates 124 and 133 and the first input of an OR gate 115 are connected to the output C4; the respective second inputs of the OR gates 115 and 134 and the first input of an OR gate 125 are connected to the output C5; and the respective second outputs of the OR gates 114, 125 and 135 are connected to the output C6. The outputs of the OR gates 113 to 115, 123 to 125, and 133 to 135 are respectively connected to the respective second inputs of AND gates 110 to 112, 120 to 122, and 130 to 132, and the respective second inputs of AND gates 140, 142, 150, 152, 160 and 162 are connected to the outputs of the OR gates 115, 113, 125, 123, 135 and 133. The output of the delay circuit 170 is connected to the respective first inputs of the AND gates 110, 120, 130, 140, 150 and 160, the output of the delay circuit 171 is connected to the respective first inputs of the AND gates 111, 121 and 131, and the output of the delay circuit 172 is connected to the respective first inputs of the AND gates 112, 122, 132, 142, 152 and 162. The outputs of the AND gates 110 to 112, 120 to 122, and 130 to 132 are respectively connected to the inputs of OR gates 101, 102 and 103 while the outputs of the AND gates 140 and 142, 150 and 152, and 160 and 162 are respectively connected to the inputs of OR gates 104, 105 and 106. The respective remaining inputs of the OR gates 104, 105 and 106 are connected to the outputs of the AND gates 111, 121 and 131. The outputs of the OR gates 101 to 106 are respectively supplied to the drive pulse generating units P1 to P6.

Figure 4:
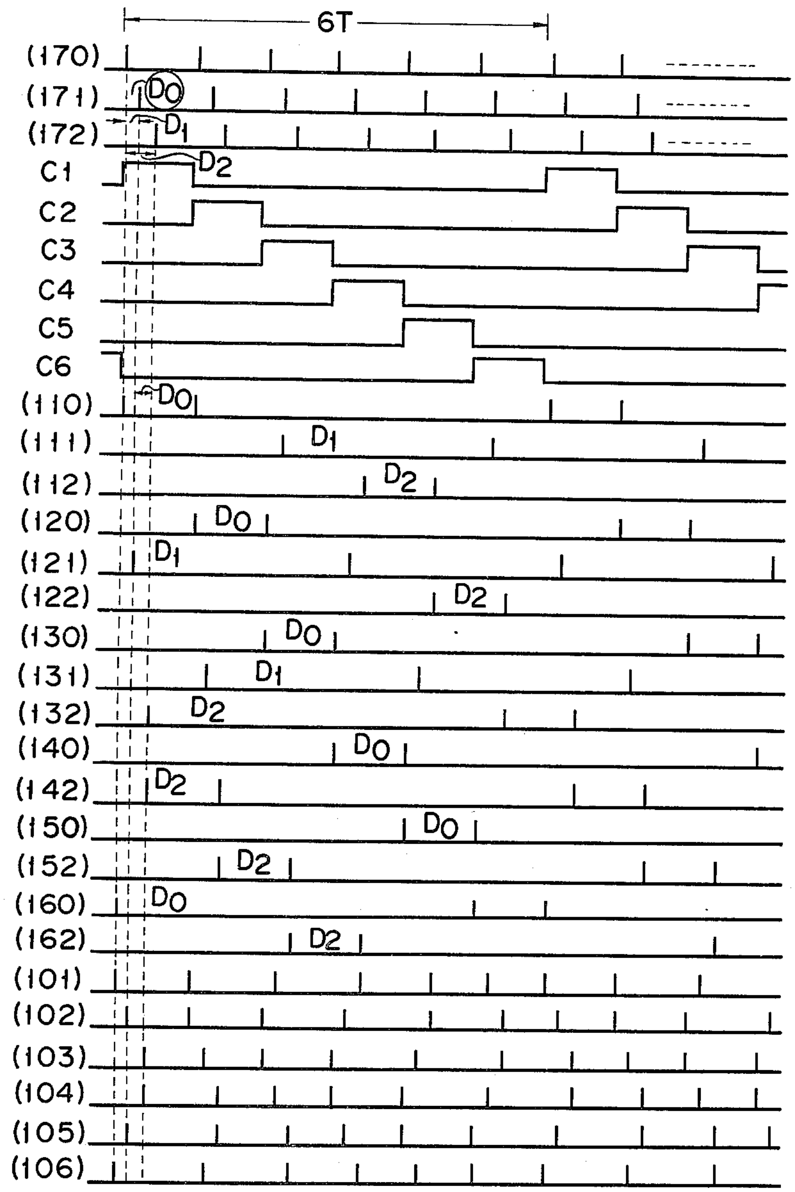
FIG. 4 shows time charts of signals generated from respective portions of the circuit diagram of FIG. 3.

In the above-mentioned circuit arrangement, when the switches S1 to S6 of the switch circuit 52 are closed and the remaining switches S7 to Sn are all opened and the shift register 502 of the control pulse generating unit 50 generates the control pulse C1, the OR gates 113, 124 and 135 generate output signals and simultaneously the delay circuits 170, 171 and 172 generate delay output signals in delay times D0, D1 and D2, respectively, as shown in the time charts of FIG. 4. For this reason, the OR gates 101 and 106 are respectively made to generate delay pulse signals in the delay time D0 in response to output signals from the AND gates 110 and 160 supplied with output signals from OR gates 113 and 135 and delay circuit 170. The OR gates 102 and 105 are respectively made to generate delay pulse signals in the delay time D1 in response to an output signal from the AND gate 121 supplied with output signals from the OR gate 124 and delay circuit 171. The OR gates 103 and 104 are respectively made to generate delay pulse signals in the delay time D2 in response to output signals from the AND gates 132 and 142 supplied with output signals from the OR gates 113 and 135 and delay circuit 172.

The drive pulse generating units P1 to P6 are respectively made to generate drive pulse signals $p1$ to $p6$ in response to delay pulse signals d1 to d6 from said OR gates 101 to 106. Said drive pulse signals $p1$ and $p6$ are generated in the delay time D0, said drive pulse signals $p2$ and $p5$ are generated in the delay time D1, and said drive pulse signals $p3$ and $p4$ are generated in the delay time D2. When the length of delay time is so determined that D0 is shorter than D1 and D1 is shorter than D2, the drive pulse signals $p1$ and $p6$ initially generated respectively energize the electro-acoustic conversion elements, for example, piezoelectric elements 1 and 6 via the switches S1 and S6, respectively, to cause elements 1 and 6 to generate ultrasonic waves. Next, delayed a prescribed time from the drive pulse signals $p1$ and $p6$ are generated the drive pulse signals $p2$ and $p5$ which respectively energize the electro-acoustic conversion elements 2 and 5 via the switches S2 and S5, respectively, to cause the elements 2 and 5 to generate ultrasonic waves. Next, slightly delayed from the drive pulse signals $p2$ and $p5$ are generated the drive pulse signals $p3$ and $p4$ which respectively energize the elements 3 and 4 via the switches S3 and S4, respectively, to cause the elements 3 and 4 to generate ultrasonic waves.

When ultrasonic waves are generated delayed bit by bit from each other in the above-mentioned manner, they are focussed on a point X1. Next, when the switches S2 to S7 are closed and the switches S1 and S8 to S*n* are opened and the shift register 502 generates the control pulse signal C2, the AND gates 110 and 120 generate output signals in a delay time D0 in response to output signals from the OR gates 113, 123 and 134 responding to said C2 and output signals from the delay circuits 170, 171 and 172, and the AND gate 131 generates the output signal in the delay time D1, and the AND gates 142 and 152 respectively generate the output signals in the delay time D2. The OR gates 101 to 106 generate the delay pulse signals *d*1 to *d*6 in response to output signals from said AND gates 110, 120, 131, 142 and 152. Said delay pulse signals *d*1 and *d*2 are generated in the delay time D0, said signals *d*3 and *d*6 are generated in the delay time D1, and said signals *d*4 and *d*5 are generated in the delay time D2. The drive pulse generator units P1 to P6 generate the drive pulses *p*1 to *p*6 in delay times corresponding to the delay times of the delay pulses *d*1 to *d*6 in response to said delay pulse signals *d*1 to *d*6. First, the drive pulses *p*2 and *p*7 energize the piezolectric elements 2 and 7 via the switches S2 and S7. Next, the pulses *p*3 and *p*6 energize the piezoelectric elements 3 and 6 with a slight delay via the switches S3 and S6, and the pulses *p*4 and *p*5 energize the piezoelectric elements 4 and 5 with a further slight delay via the switches S4 and S5. When as above described, the respective piezoelectric elements 2 to 7 are energized with a prescribed time delay, ultrasonic wave beams generated from said elements are focussed on a point X2 as indicated in broken lines. This point X2 is parallel-shifted to an extent of one piezoelectric element from the point X1. When, as above described, the switching operations of the switches S1 to S*n* of the switch circuit 52 are displaced switch by switch and simultaneously the delay times D0, D1 and D2 of the delay pulses are properly determined, the focussing points X1, X2 . . . Xn of the ultrasonic wave beams can be shifted in turn in the order mentioned, thereby enabling ultrasonic wave beams to scan the object substance. Table 1 shows the relationship between the focussing points X1, X2, X3, X4, X5, X6 . . . X*n*−5 and the delay times D0, D1 and D2 of the delay pulses *d*1 to *d*6.

Table 1

| Focussed point | d1 | d2 | d3 | d4 | d5 | d6 |
|---|---|---|---|---|---|---|
| X1 | D0 | D1 | D2 | D2 | D1 | D0 |
| X2 | D0 | D0 | D1 | D2 | D2 | D1 |
| X3 | D1 | D0 | D0 | D1 | D2 | D2 |
| X4 | D2 | D1 | D0 | D0 | D1 | D2 |
| X5 | D2 | D2 | D1 | D0 | D0 | D1 |
| X6 | D1 | D2 | D2 | D1 | D0 | D0 |
| . | . | . | . | . | . | . |
| . | . | . | . | . | . | . |
| . | . | . | . | . | . | . |
| Xn-5 | D0 | D1 | D2 | D2 | D1 | D0 |

As apparent from the above Table 1, the focussing points are shifted in turn by regularly repeating the delay times D0, D1 and D2 of the delay pulses *d*1 to *d*6 in the form of D0(=0)→D1→D2→D2→D1→D0→D1.

There will now be described the manner in which the delay times D0, D1 and D2 are determined, by reference to FIG. 5. When the distance between the point which is the middle point of the row of the piezoelectric elements 1, 2, 3, . . . 6 and situated on the surface of the middle element and the point X situated on a line perpendicular to said row is expressed by $x$, the differences $\Delta x$, $\Delta x2$ and $\Delta x3$ between the distance $x$ and the distances between the respective piezoelectric element plane and the point X are respectively expressed by the equations:

$$\Delta x1 = \sqrt{x^2 + (d/2)^2} - x \quad (1)$$

$$\Delta x2 = \sqrt{x^2 + (3d/2)^2} - x \quad (2)$$

$$\Delta x3 = \sqrt{x^2 + (5d/2)^2} - x \quad (3)$$

where $d$ represents the pitch between the two adjacent elements. When, accordingly, the speed at which ultrasonic wave beams pass through a medium is indicated by C, the differences $\Delta t_1$, $\Delta t_2$ and $\Delta t_3$ of times required for ultrasonic wave beams to reach the point X from the respective piezoelectric elements are expresses as follows:

$$\Delta t_1 = \Delta x1/c \quad (4)$$

$$\Delta t_2 = \Delta x2/c \quad (5)$$

$$\Delta t_3 = \Delta x3/c \quad (6)$$

When, accordingly, the delay time D0 of drive pulses supplied to the piezoelectric elements 1 and 6 is set to 0 and said D0 is taken as a reference, the delay time D1 of pulses supplied to the piezoelectric elements 2 and 5 is expressed by the equation:

$$D1 = \Delta t_3 - \Delta t_2 = (\Delta x3 - \Delta x2)/c$$

The delay time D2 of pulses supplied to the piezoelectric elements 3 and 4 is expressed by the equation:

$$D2 = \Delta t_3 - \Delta t_1 = (\Delta x3 - \Delta x1)/c$$

Figures 5, 6:
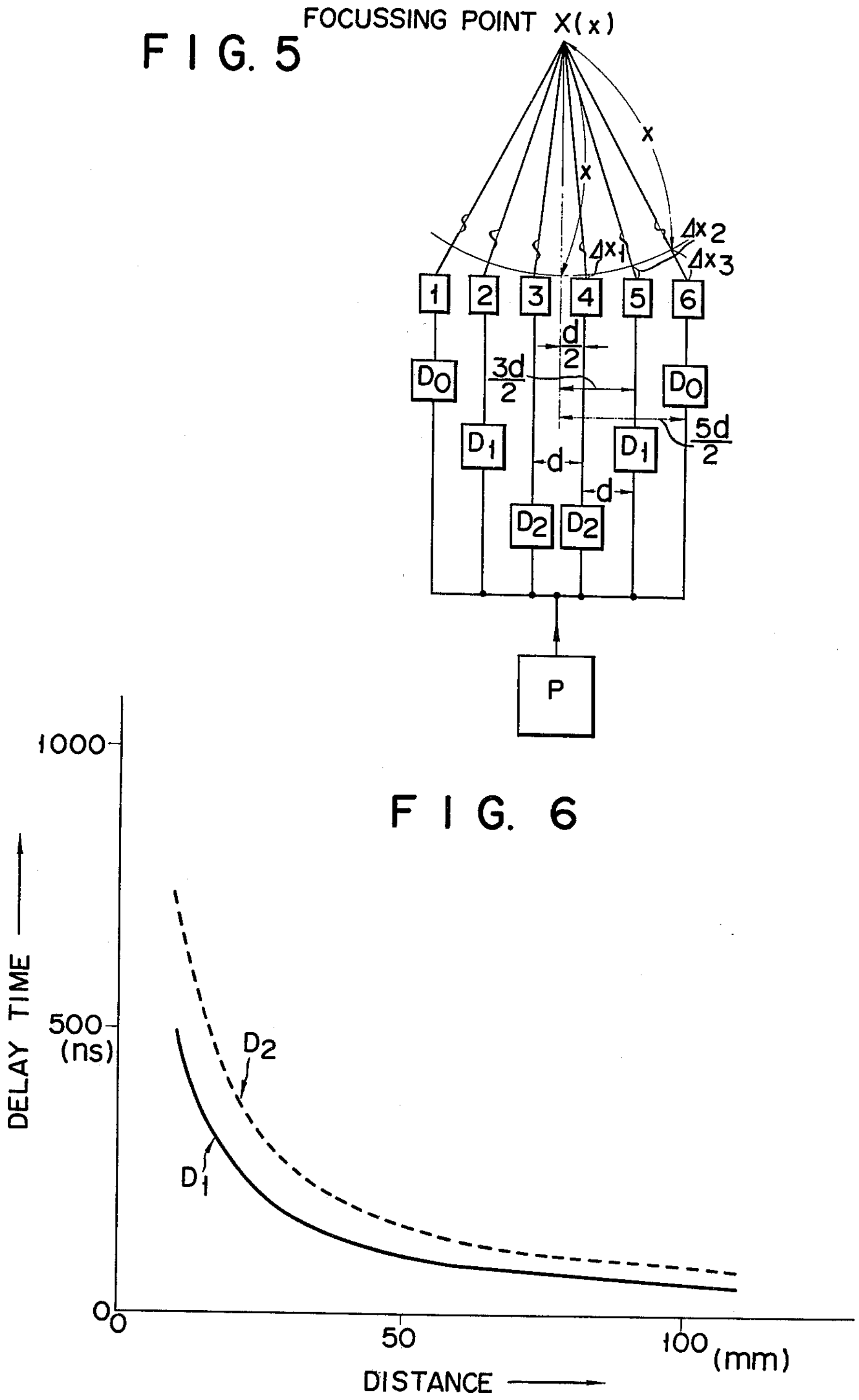
FIG. 5 illustrates the relationship between the delay times of delay circuits and the point on which ultrasonic wave beams are focussed.
FIG. 6 is a graphic diagram showing the relationship of delay time with a distance x between the ultrasonic wave beam-focussed point and the planes of piezoelectric elements.

If the delay times D0, D1 and D2 are respectively determined in this manner, ultrasonic wave beams generated from the piezoelectric elements 1 to 6 will be able to be focussed on the proximity of the point X.

Where the pitch $d$ between the two adjacent piezoelectric elements is set at 2 mm and the speed $c$ of ultrasonic waves at 1500, the relationship of the delay times D1 and D2 with a distance x between the point X and the piezoelectric elements is shown in FIG 6. From FIG. 6 it is understood that when the delay times D1 and D2 are varied, the position of the focussing point X of ultrasonic wave beams can be varied. Accordingly, as shown in FIG. 3, a plurality of output terminals are derived from the delay circuits 170, 171 and 172 and properly changed over, thereby enabling the position of the focussing point X to vary, thus enabling ultrasonic wave beams to scan a prescribed point of the object substance without varying the position of the apparatus.

Said switch circuit 52 is an electronic switch circuit, the circuit construction of which will hereinafter be explained by reference to FIG. 7.

Figure 7:
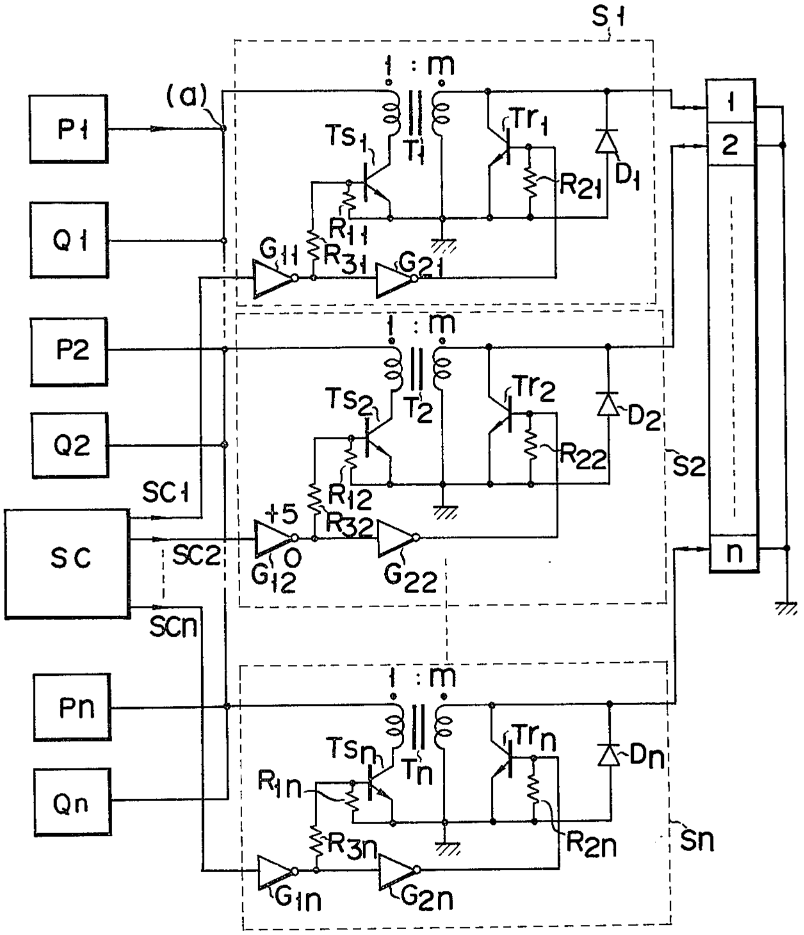
FIG. 7 is a circuit diagram showing the circuit construction of the switch circuit of FIG. 2.
Figure 8A:
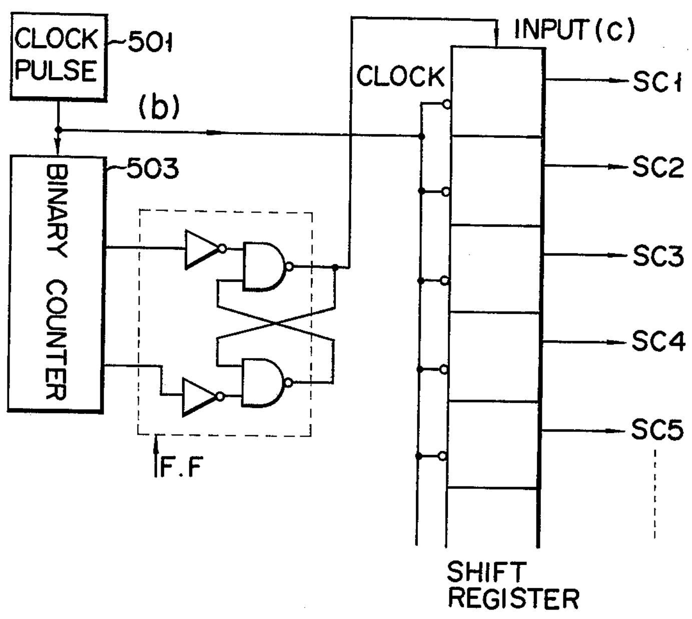
FIG. 8A is a block circuit diagram showing a switch circuit controlling signal generator designed to generate control signals for controlling the switch circuit of FIG. 7.
Figure 8B:
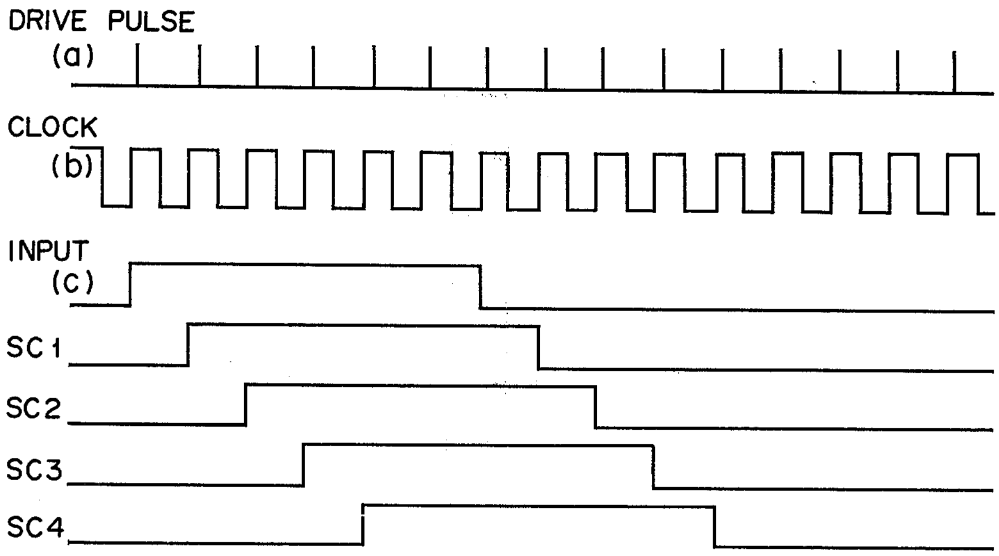
FIG. 8B shows time charts of signals generated from respective portions of FIG. 8A.

The analogue switch circuit unit shown in FIG. 7 has analogue switches S1 to S*n* having the same circuit construction. To explain the circuit construction of, for example, the analogue switch S1, the primary winding of a pulse transformer $T_1$ is connected at one end to the drive pulse generating unit P1 and the ultrasonic wave receiving signal treating apparatus Q1 and connected at the other end to the collector of a transistor $Ts_1$, the base of which is connected to the emitter thereof via a resistor $R_{11}$ and grounded together with said emitter. The secondary winding of the pulse transformer $T_1$ is connected at one end to the collector of the transistor $Tr_1$, the cathode of a diode D1 and the piezoelectric element 1, and grounded and simultaneously connected at the other end to the emitter of the transistor $Tr_1$ and to the base thereof via a resistor $R_{21}$ and the anode of the diode D1. The base of said transistor $Ts_1$ is connected to the output terminal of an inverter $G_{11}$ via a resistor $R_{31}$ while the base of the transistor $Tr_1$ is connected to the output terminal of the inverter $G_{11}$ via the inverter $G_{21}$. The input terminal of the inverter $G_{11}$ is connected to one output terminal of a switch controlling circuit SC. Said switch controlling circuit is constructed, for example, as shown in FIG. 8A. A signal shown in FIG. 8B*b* which is generated from a clock pulse generator 501 is supplied to a binary counter 503 and passed through a flip-flop circuit FF to obtain a signal shown in FIG. 8B*c*. Said signal (c) and said signal (b) from the clock pulse generator 501 are supplied to a shift register to obtain signals SC1, SC2, SC3 . . . SC*n* shown in FIG. 8B. Outputs SC1 to SC*n* from said switch control circuit SC are respectively supplied to the analogue switches S1 to S*n*.

To explain the aforesaid switch circuits S1 to S*n*, first, the output signals SC1 to SC6 from the switch controlling circuit SC are supplied to the switches S1 to S6. To explain, for example, the operation of the switch S1 alone, the output signal SC1 from the circuit SC is applied as a positive bias voltage applied to the bias of the transistor $Ts_1$ via the inverter $G_{11}$ and the resistor $R_{31}$ to render this transistor conducting. On the other hand, the output of the inverter $G_{11}$ is applied as a negative bias voltage to the base of the transistor $Tr_1$ via the inverter $G_{21}$ to render this transistor nonconducting. Thus, the drive pulses from the drive pulse generator unit P1 energize the piezoelectric element 1 via the primary winding of the pules transformer T1, the collector and emitter of the transistor $Ts_1$, and the secondary winding of the pulse transformer $T_1$ in the order mentioned. The remaining switches S2 to S6 are also operated in the same manner as mentioned above. Next, when the output signals SC2 to SC7 are generated from the switch control circuit SC, the switches S2 to S7 are rendered conducting and the switches S8 to Sn are rendered nonconducting. That is to say, in the switch S1 the transistor $Ts_1$ is turned off and the transistor $Tr_1$ is turned on. The above mentioned switch circuit was explained only as one example, and may be of any construction if it electronically performs the switching operations in accordance with prescribed control signals.

The foregoing description referred to the operations in which the object substance was scanned by the focussed ultransonic wave beams, namely the ultransonic wave transmitting operation. There will hereinafter be described the operation in which the image of the object substance is obtained by converting ultrasonic wave beams reflected from the object substance again into electrical signals, namely the ultrasonic wave receiving operation.

Figure 9:
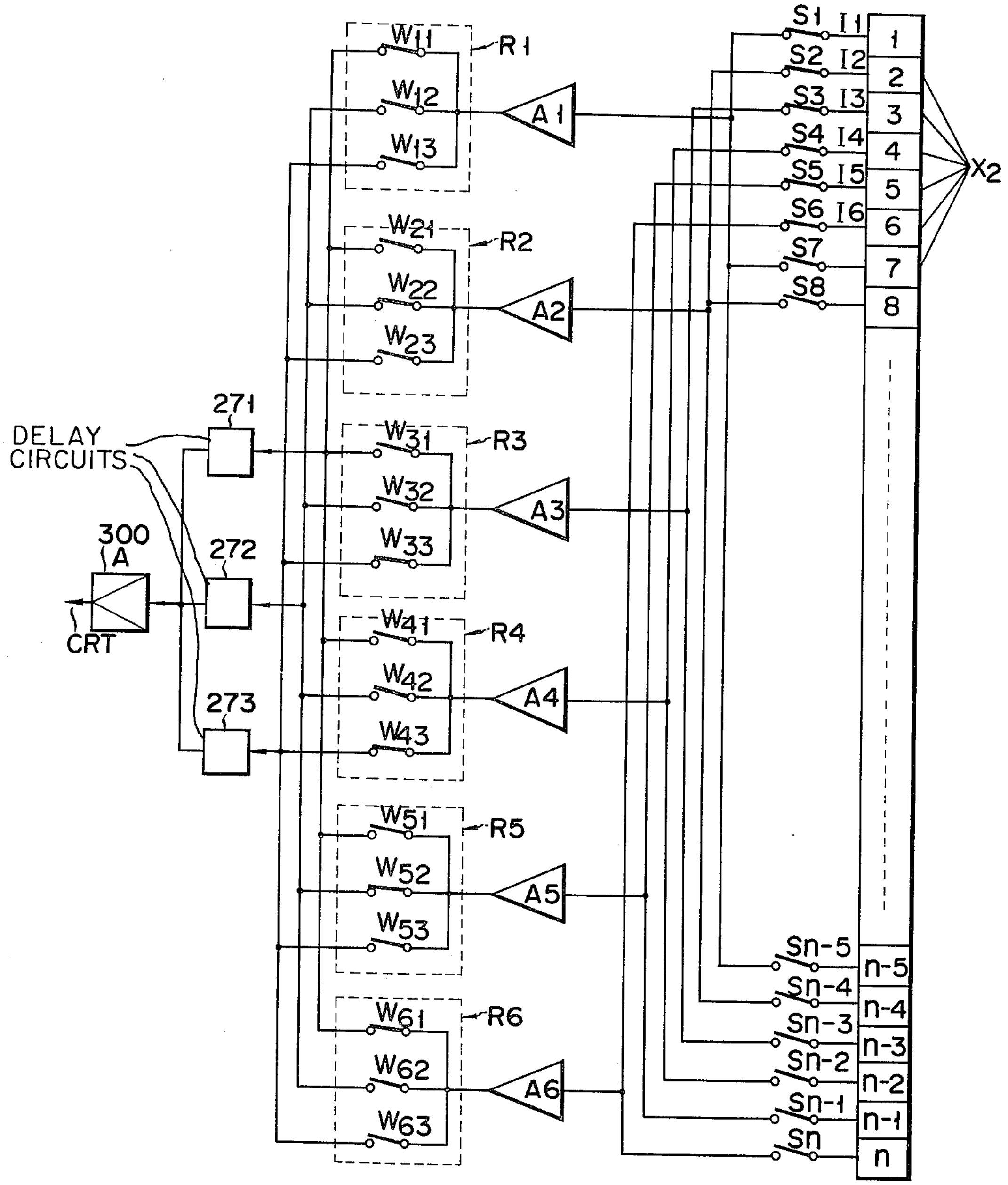
FIG. 9 is a circuit diagram showing the ultrasonic wave receiving circuit of the ultrasonic wave transmitting and receiving apparatus according to the invention.
Figure 10:
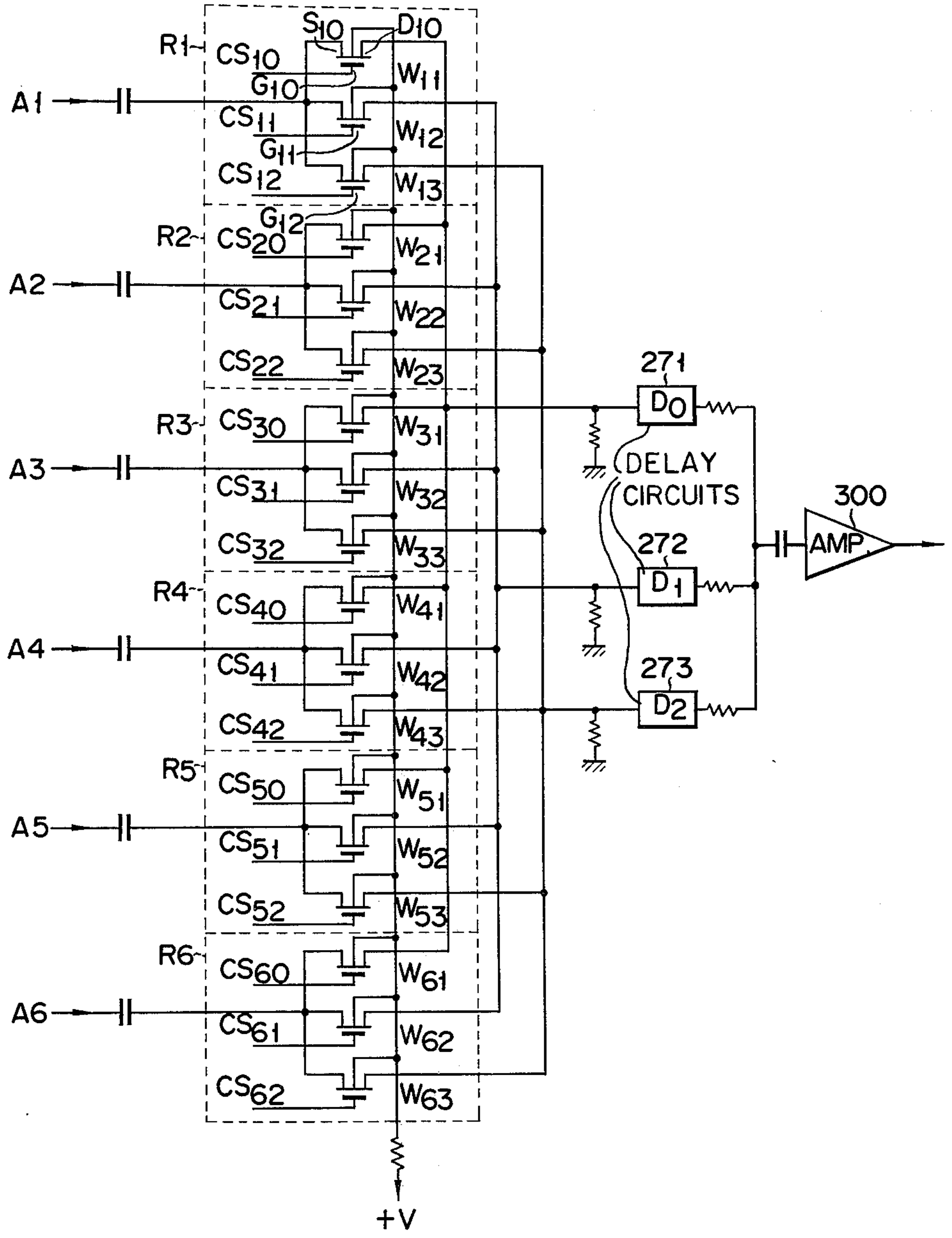
FIG. 10 is a circuit diagram showing the received information signal switching circuit of the ultrasonic wave receiving circuit of FIG. 9.
Figure 11A:
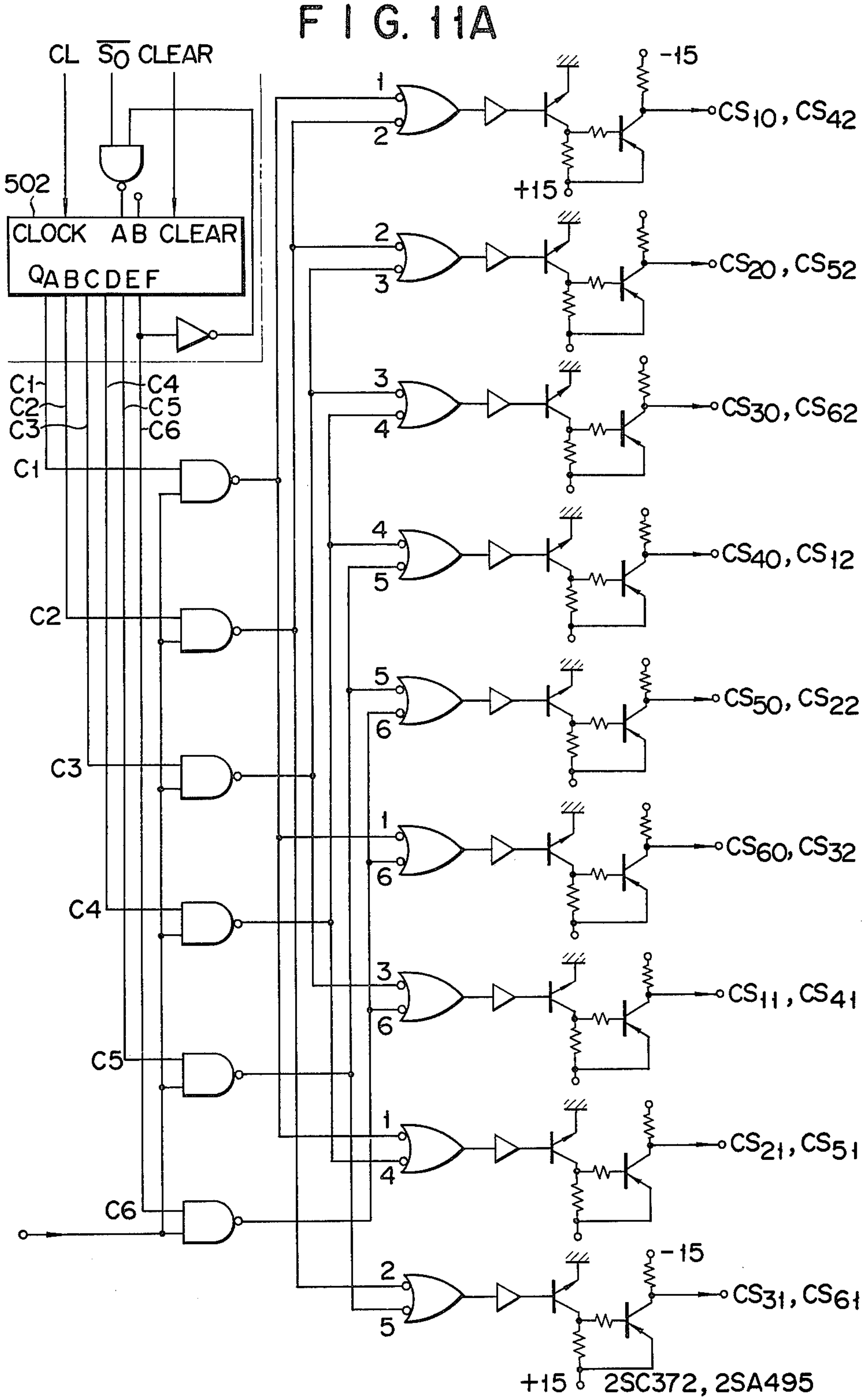
FIG. 11A is a circuit diagram showing an ultrasonic wave receiving signal switching circuit controlling signal generator for controlling the ultrasonic wave receiving signal switching circuit of FIG. 10.
Figure 11B:
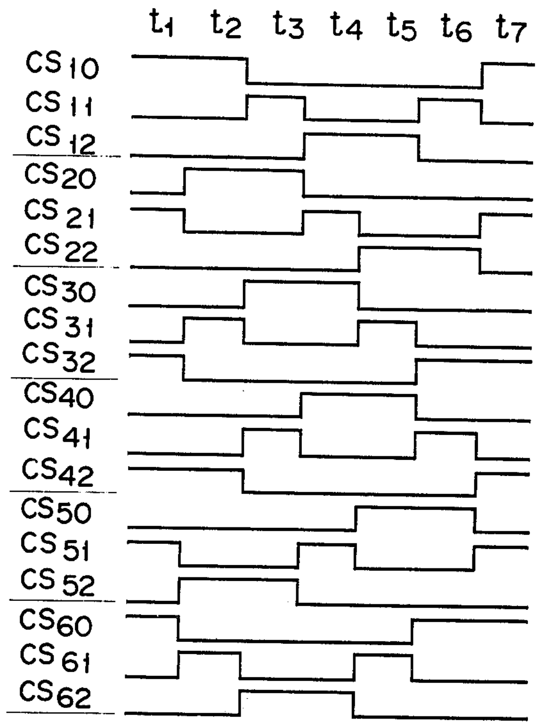
FIG. 11B shows time charts of control signals being supplied to said circuit of FIG. 10.

In the ultrasonic wave receiving circuit shown in FIG. 9, ultrasonic wave beams reflected from the object substance are converted into information signals I1 to I6 by the same piezoelectric elements 1 to 6 of the electro-acoustic conversion unit 53 as those used to transmit ultrasonic waves. The information signals I1 and I6 are received in the delay time D2, the signals I2 and I5 are received in the delay time D1, and the signals I3 and I4 are received in the delay time D0. These information signals are respectively supplied to amplifiers A1 to A6 via the same electronic switches S1 to S6 of the switch circuit 52 as those used to transmit ultrasonic waves. The information signals I1 to I6 thus amplified are respectively supplied to ultrasonic wave receiving signal-switching circuits $R_1$ to $R_6$ equivalently shown. Said switching circuits $R_1$ to $R_6$ are respectively constituted by three electronic switches namely $W_{11}$ to $W_{13}$, $W_{21}$ to $W_{23}$, $W_{31}$ to $W_{33}$, $W_{41}$ to $W_{43}$, $W_{51}$ to $W_{53}$, and $W_{61}$ to $W_{63}$. Said information signals I1 and I6 are supplied to a delay circuit 271 having the delay time D0 via the respective closed switches $W_{11}$ and $W_{61}$ of said switching circuits $R_1$ and $R_6$, the signals I2 and I5 are supplied to a delay circuit 272 having the delay time D1 via the closed switches $W_{22}$ and $W_{52}$, respectively, and the signals I3 and I4 are supplied to a delay circuit 273 having the delay time D2 via the closed switches $W_{33}$ and $W_{43}$, respectively. The information signals I1, I6; I2, I5; and I3, I4 generated in the different delay times D2, D1 and D0 are made to coincide in time with each other by said delay circuits 271, 272 and 273 and composed and then supplied to an amplifier 300. The composed information signals amplified by said amplifier 300 are supplied, for example, to a cathode ray tube CRT, thereby causing the image of an object substance to appear on said tube. The information signals I2 to I7 corresponding to the next scanning point X2 are supplied to the ultrasonic wave receiving signal-switching circuits $R_2$ to $R_6$ and $R_1$ via the switches S2 to S7 and amplifiers A1 to A6. The information signals I2 to I7 supplied to said switching circuits are passed through the switches $W_{21}$, $W_{32}$, $W_{43}$, $W_{53}$, $W_{62}$ and $W_{11}$ closed by switch controlling signals. Then, the signals I2 and I7 are entered into the delay circuit 271, the signals I3 and I6 are entered into the delay circuit 272, and the signals I4 and I5 are entered into the delay circuit 273. The information signals composed via said delay circuits 271 to 273 cause the image of the scanning point X2 to be projected on said cathode ray tube. Said switching circuits $R_1$ to $R_6$ are more concretely illustrated in FIG. 10. The MOS type analogue gates $W_{11}$ to $W_{63}$ of said more concretely illustrated circuits are controlled by control signals $CS_{10}$ to $CS_{62}$ shown by time charts of FIG. 11B, and said control signals are obtained from the shift register 502 by a circuit of FIG. 11A.

As above described, a prescribed image is projected on the cathode ray tube in response to the reflected waves of ultrasonic wave beams continuously scanning the object substance. This embodiment referred to an appparatus in which the piezoelectric elements were operated in units of six elements, but said element number may optionally be determined.

As above described, this invention permits the generation of focussed ultrasonic wave beams by driving the piezoelectric elements for every prescribed number of elements in a relative delay relationship while the elements are being displaced in turn one by one, thereby attaining good directional characteristics of the apparatus. For example, where the width of one piezoelectric element, the oscillation frequency, a distance *x* between the focussing point and the row of piezoelectric elements, and the number of simultaneously driven piezoelectric elements are respectively set at 2 mm, 2 MHz, 6 cm and 6, there can be obtained such excellent directional characteristics as shown in FIG. 12.

Figure 12:
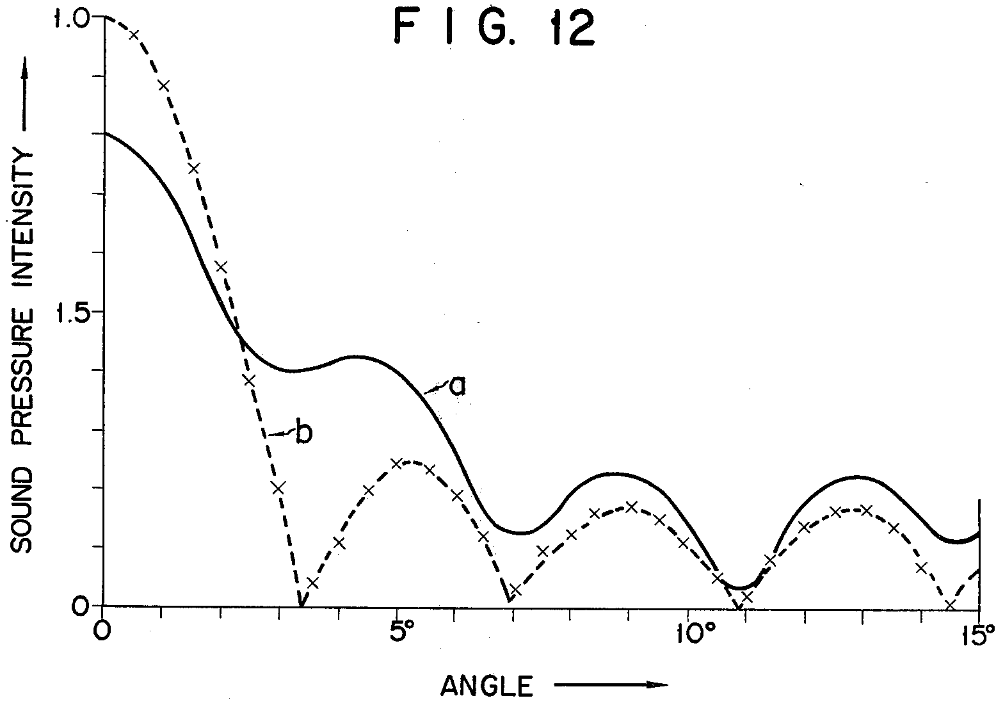
FIG. 12 is a graphic diagram illustrating the directional characteristics of the ultrasonic wave transmitting circuit of the apparatus according to the invention.

The directional characteristics of FIG. 12 are the ones attained in the case of the transmission of ultrasonic waves, but the synthesized directional characteristics of the ultrasonic wave transmission and receipt are attained by raising to the second power the directional characteristics of FIG. 12. Accordingly, the apparatus of the invention presents an extremely excellent bearing resolution. In other words, the intensity of ultrasonic waves in the proximity of the focussing point and the ultrasonic wave receiving signal voltage corresponding to the waves reflected from the proximity of the focussing point are higher than those in the prior art apparatus using no focussing system of ultrasonic wave beams. Further, the apparatus of the invention has a sensitivity proportional to the second power of the sensitivity of the prior art apparatus.

What we claim is:

1. An ultrasonic wave transmitting and receiving apparatus comprising an ultrasonic wave transmitting device for emitting ultrasonic wave beams being focussed, provided with a control signal generating unit for generating control signals in turn in a circulating manner, a delay pulse signal generating unit for generating a plurality of delay pulse signals in respective prescribed delay times in response to control signals from said control signal generating unit, a plurality of drive signal generating units for generating drive signals in delay times corresponding to those of said delay pulse signals in response to delay pulse signals from said delay pulse signal generating unit, a switching circuit unit having a plurality of electronic switches designed to perform the switching operation by being displaced in turn one by one for every prescribed number of switches so as to supply drive signals from said drive signal generating units to prescribed electro-acoustic conversion elements, respectively; and an ultrasonic wave receiving device for receiving the reflected waves of said ultrasonic wave beams and detecting ultrasonic wave receiving signals via said switching circuit unit and composing said signals through delay means.

2. An ultrasonic wave transmitting and receiving apparatus according to claim 1 wherein said delay pulse generating unit comprises a plurality of OR gates selectively operated to generate output signals in response to control signals generated in turn from said control signal generating unit, a plurality of delay circuit units each having a different prescribed length of delay time, a plurality of AND gates selectively operated to generate output signals in response to the respective outputs from said delay circuit units and OR gates, and a plurality of OR gates for generating output signals in delay times corresponding to those of said delay circuit units in response to outputs from said AND gates.

3. An ultrasonic wave transmitting and receiving apparatus according to claim 1 wherein said switching circuit unit includes a switch controlling circuit for generating control signals for selectively operating said electronic switches of said switching circuit unit.

4. An ultrasonic wave transmitting and receiving apparatus according to claim 3 wherein each of said electronic switches includes a pulse transformer connected to a prescribed one of said drive signal generating units and a semiconductor switching element for passing therethrough drive signals generated via said pulse transformer from said prescribed one of the drive signal generating units, in response to control signals from said switch controlling circuit.

5. An ultrasonic wave transmitting and receiving apparatus according to claim 1 wherein said ultrasonic wave receiving device includes a plurality of amplifiers for respectively amplifying ultrasonic wave signals detected via said switching circuit unit, an ultrasonic wave signal switching circuit having a plurality of electronic switches made to perform the switching operation so as to supply the respective outputs from said amplifiers to prescribed delay circuits, a plurality of delay circuit units for equalizing the delay times of ultrasonic wave receiving signals obtained via said switch circuit, and means for composing outputs from said delay circuit units.

* * * * *